(12) United States Patent
Heil

(10) Patent No.: US 12,286,792 B2
(45) Date of Patent: Apr. 29, 2025

(54) SHEET MATERIAL ARRANGEMENT

(71) Applicant: Gluetex GmbH, Klettgau Erzingen (DE)

(72) Inventor: Dietmar Heil, Rafz (CH)

(73) Assignee: Gluetex GmbH, Klettgau Erzingen (DE)

( * ) Notice: Subject to any disclaimer, the term of this patent is extended or adjusted under 35 U.S.C. 154(b) by 395 days.

(21) Appl. No.: 17/994,658

(22) Filed: Nov. 28, 2022

(65) Prior Publication Data
US 2023/0167642 A1 Jun. 1, 2023

(30) Foreign Application Priority Data
Nov. 26, 2021 (EP) .................................... 21210651

(51) Int. Cl.
*B32B 3/02* (2006.01)
*E04F 10/06* (2006.01)

(52) U.S. Cl.
CPC ............ *E04F 10/0633* (2013.01); *B32B 3/02* (2013.01); *E04F 10/0607* (2013.01)

(58) Field of Classification Search
CPC ........................................................ B32B 3/02
See application file for complete search history.

(56) References Cited

U.S. PATENT DOCUMENTS
2022/0290496 A1* 9/2022 Hasler ..................... E06B 9/581

FOREIGN PATENT DOCUMENTS

| DE | 19739919 | 3/1999 |
| DE | 102004017459 | 10/2005 |
| DE | 102005048207 | 11/2006 |
| DE | 102016120299 | 4/2018 |
| EP | 1553259 | 1/2004 |
| EP | 2492433 | 8/2012 |

* cited by examiner

*Primary Examiner* — Elizabeth E Mulvaney
(74) *Attorney, Agent, or Firm* — Volpe Koenig

(57) ABSTRACT

A sheet material arrangement having a flexible primary sheet material and an edge member with two legs pivotably connected together. The first leg has two outer portions of a band-shaped secondary sheet material and is connected to the primary sheet material along an edge portion. A central portion of the secondary sheet material is looped around an insert transversely to the longitudinal direction of said secondary sheet material and, together with this insert, forms a second leg which is connected to the first leg so as to be pivotable about a pivot axis. In a pivoting position, with the legs arranged approximately parallel, the edge member and the sheet material can be rolled up on a winding shaft. In a further pivoting position, the legs form an angle of inclination different than 0°, with the result that the second leg is useable for guided displacement in a guide rail.

10 Claims, 4 Drawing Sheets

SHEET MATERIAL ARRANGEMENT

INCORPORATION BY REFERENCE

The following documents are incorporated herein by reference as if fully set forth: European Patent Application No. 21210651.2, filed Nov. 26, 2021.

TECHNICAL FIELD

The invention relates to a sheet material arrangement, comprising a sheet material and at least one edge member, which is connected to the sheet material along an edge portion of the sheet material, as per the features of patent claim 1.

BACKGROUND

Examples of such sheet material arrangements are awning cloths. They may comprise one or more cloth webs. In the case of such awning cloths, one or more edge portions may comprise an edge member, e.g. welting that is received in a welting seam and is intended for fastening to an awning-cloth shaft or to a deployment profile.

Vertical awnings generally comprise lateral guide elements, by means of which the awning cloth can be displacably held between two lateral guide rails in a guided manner. In particular, for this purpose the awning cloth may comprise weltings similar to those of a zip fastener at the lateral edges. The awning cloth is thicker in the edge regions with the zip-fastener weltings than in the central region in between. When the awning cloth is being rolled up onto a winding shaft, the space requirement is therefore greater in the edge regions than in the central region. Different tensile forces acting on the sheet material can cause the edge regions of the sheet material to warp.

DE19739919A1 discloses a sunblind having a roller blind web which can be rolled up and the opposite lateral edges of which comprise easily bendable stiffeners of plastic. The stiffened lateral edges can be rolled up onto a winding tube and bent in order to be guided into lateral guide rails.

DE102004017459A1 discloses a sliding roof system with a flexible sheet material. For each of the longitudinal edges of this sheet material, only the outer half of a thin metal strip that can be rolled up and is made of spring sheet is adhesively bonded on. For the purpose of guidance in lateral guides, the free inner half of these metal strips can be brought into a form fit in contact with these lateral guides.

DE102005048207B3 relates to a roller blind arrangement for a motor vehicle. A roller blind web comprises flexible metal guide bands along its longitudinal edges. They can be sewn into lateral pockets of the roller blind web or adhesively bonded to the roller blind web. If such sheet material arrangements are rolled up onto a winding shaft, the rolled-up sheet material has a larger outer diameter in the edge regions than in the central region in between on account of the greater material thickness. This can cause distortion and undesired waviness of the sheet material.

For a similar arrangement, EP1553259A1 proposes forming recesses for the thicker end regions in the end regions of a winding shaft, or letting the thicker regions protrude axially beyond the ends of the winding shaft.

DE102016120299A1 discloses an insect protection roller blind, with, along the longitudinal edges of a woven-fabric web, a respective textile connecting strip of a guide band being welded to the woven fabric of the woven-fabric web. At its outermost edge, each guide band comprises a row of protruding zip-closure teeth, which together form a row of guide elements for guidance in lateral guide rails. The end regions of the winding shaft comprise head pieces with concavely curved supporting ribs. These support the thicker end regions of the insect protection roller blind when it is rolled up, with the result that they are rolled up with a defined waviness.

SUMMARY

An object of the present invention is to provide a sheet material arrangement which comprises a sheet material and at least one edge member connected to this sheet material in the edge region of the sheet material and which can be rolled up onto a cylindrical shaft with little distortion. This object is achieved by a sheet material arrangement having one or more of the features disclosed herein.

The sheet material arrangement comprises a flexible primary sheet material and at least one edge member, which is arranged along an edge portion of the primary sheet material and connected thereto.

The primary sheet material may for example be an awning cloth that can be rolled up onto a winding shaft. A respective edge member is connected to the respective woven-fabric web of the awning cloth at least along the two lateral edges. Each edge member comprises two band-like legs that are connected to one another so as to be pivotable about a common pivot axis. The pivot axis runs in the longitudinal direction of the two legs. In the case of the first leg, the pivot axis is arranged substantially at one of the longitudinal edges of this leg. In the case of the second leg, depending on the embodiment of the edge member, the pivot axis runs in a central region between the two longitudinal edges or, alternatively, at one of the longitudinal edges of this leg. Depending on the embodiment of the edge member, its cross section may be T-shaped or L-shaped if the second leg is aligned orthogonally with respect to the first leg. In embodiments with a T-shaped cross section, a respective portion of the second leg protrudes on either side of the first leg, and in embodiments with an L-shaped cross section, it protrudes only on one side. The maximum usable pivoting range is delimited by the two legs mutually lying against one another. The pivoting range may be approximately 180° for T-shaped arrangements.

In One Embodiment of the Edge Member

In a three-dimensional first configuration, with the second leg protruding out of the plane of the first leg, the edge member may be used as guide element for guiding the awning cloth, or the primary sheet material overall, in a guide rail with e.g. a C-shaped cross section. In this case, the second leg of the edge member is held or guided in a form-fitting manner in the interior of the guide profile. The first leg is guided through a gap between the opposite longitudinal edges of the guide profile and connected to the edge of the woven-fabric web of the awning cloth. The second leg of the edge member is flexurally rigid enough that it remains held securely in the guide profile even in the event of gusts of wind and the associated tensile forces of the awning cloth. Such edge members can be displaced along the guide profile with very little wear or noise.

By contrast, this configuration of the edge member does not make it possible to roll the sheet material arrangement up onto a winding shaft aligned transversely with respect to the longitudinal direction of the edge member.

In at least one further configuration of this same edge member, its second leg can be pivoted or folded over to the extent that it is aligned substantially parallel to the first leg and to the woven fabric of the awning cloth. In this flat further configuration, the sheet material arrangement can be rolled up onto a winding shaft aligned transversely with respect to the longitudinal direction of the edge members.

The leg thicknesses are preferably dimensioned such that the maximum thickness of the edge member in this further configuration is smaller than or the same as the thickness of the primary sheet material to which the edge member is connected. In this configuration, the sheet material arrangement can be rolled up onto a winding shaft without distortion and without the formation of folds or waves in the primary sheet material.

This configuration can be locally modified in the longitudinal direction of the edge member. In particular, in the first configuration edge members of an awning cloth can be guided in lateral guide rails in a first portion and in the second configuration said edge members can be rolled up onto a winding shaft in a second portion. In comparatively short transition portion, the alignment of the second leg relative to the first leg is transferred from the one to the other configuration by torsion. When the awning cloth is being rolled up or unrolled, the position of the transition region and the proportions of the edge members in the first configuration and the second configuration change continually.

The edge member comprises a very thin, band-like secondary sheet material which loops around or encapsulates an insert transversely to the longitudinal direction of said secondary sheet material and, together with this insert, defines the second leg in this region. End portions of the secondary sheet material that adjoin the looping-around region together form the first leg. They are adhesively bonded to one another or connected to one another in another way, e.g. welded together or sewn together, at least in a portion adjoining the insert. In this portion, the first leg accordingly comprises two plies of the secondary sheet material. The secondary sheet material is preferably also connected, e.g. adhesively bonded, to the insert. This ensures that the insert is arranged in a defined position relative to the secondary sheet material.

The first leg may have a two-ply form over its entire width or alternatively only over part thereof. In other words, the two end portions of the secondary sheet material may have the same or different widths. The maximum thickness of the edge member when the second leg is folded over, or aligned parallel to the first leg, corresponds approximately to four times the thickness of the secondary sheet material plus the thickness of the insert and optionally the thickness of the respective adhesive layers. With suitable adhesives, the thickness of the adhesive layers can be very thin, with the result that they can be disregarded in comparison to the thicknesses of the secondary sheet material and the insert.

The maximum thickness of the edge member in the configuration with parallel-aligned legs is comparatively small. It may be of the order of magnitude of the thickness of the primary sheet material, for example. It is preferably smaller than or the same as the thickness or the maximum thickness of the primary sheet material. In the case of awning cloths with at least two fabric webs connected to one another in an overlapping region, the maximum thickness of the primary sheet material is approximately twice as great as the single thickness of the awning cloth.

The secondary sheet material may comprise e.g. a woven fabric, a foil, a laminate or a combination of at least two such materials. The band-like secondary sheet material may have a consistent or locally different form. It may have zones with different properties, in particular transversely to its longitudinal direction. It may, for example, comprise one or more portions or longitudinal strips with a bidirectionally elastic woven fabric. In this respect, the elastic properties may be the same or different in the longitudinal direction and in the transverse direction. Different properties of individual portions of the secondary sheet material may be brought about, for example, in that the secondary sheet material in these regions comprises a different number of layers or material plies and/or different materials such as e.g. PET monofilament and/or different structures such as e.g. incisions or recesses. This applies analogously also for portions of edge members having such secondary sheet materials.

In further embodiments, the secondary sheet material may comprise a thin, rigid laminate over its entire surface area or at least in a portion or strip. Said laminate may in particular comprise fibers with a high tensile strength, such as e.g. Dyneema® fibers, aramid fibers or carbon fibers manufactured from HPPE (High Performance Polyethylene). Properties such as flexural rigidity, elasticity, tensile strength, UV stability, resistance to chemicals, resistance to environmental influences and the like may be defined by suitable materials or material combinations in accordance with the respective requirements.

The band-like secondary sheet material may comprise e.g. outer strips which adjoin a central strip on either side and have a greater or lesser elasticity compared to the central strip.

In the case of a secondary sheet material comprising a layer or ply of a material with low extensibility, its movability locally or in certain regions can be increased by interruptions or recesses, in particular by incisions. Thus, the secondary sheet material may have e.g. incisions along its longitudinal edges, which incisions are spaced apart from one another uniformly or non-uniformly and are arranged in the same or different alignments. This makes it possible to adapt properties like the movability of the secondary sheet material in the region in which it is connected to the primary sheet material to corresponding properties of the primary sheet material. In addition or as an alternative, the secondary sheet material may also comprise structures, such as e.g. recesses or incisions, in the region of the first leg and/or the second leg of the edge member.

In the case of awnings, the first leg of each of the edge members preferably comprises a portion which is elastically deformable transversely to the longitudinal direction. In the case of a fabric hanging guided in lateral guide rails, it is thus possible to increase the width tolerance and improve wind stability.

At least one ply of the secondary sheet material overlaps an edge strip of the primary sheet material and is connected thereto e.g. by means of a hotmelt adhesive. Optionally, two plies of the secondary sheet material may be connected to an edge strip of the primary sheet material on opposite surfaces. As a result, the edge of the primary sheet material is arranged in a protected manner between the two plies of the secondary sheet material. Such two-sided connections are very secure and afford a very high resistance to tearing.

In alternative embodiments, one or both plies of the secondary sheet material may also be connected to the edge strip of the primary sheet material only on one side. Such connections, as are created e.g. by adhesive bonding, hotmelt bonding and/or ultrasonic welding, are comparatively easily producible and likewise secure.

The insert enclosed by the secondary sheet material is intended to confer one or more properties desired for the respective application of the sheet material on the edge member or its second leg. These properties are defined by values or value ranges of isotropic or direction-dependent parameters. Examples of such parameters are rigidity under extension, shear stiffness, torsional rigidity and flexural rigidity, cross-sectional shape, geometric dimensions, elasticity and electrical conductivity.

Inserts may in particular comprise planar or curved, flat band elements made of a material such as e.g. PET or a metal such as e.g. spring steel. As an alternative or in addition to such band elements, inserts may also comprise wires, such as e.g. spring-steel wires, and/or readily electrically conductive copper wires. Such wires may be arranged approximately in a straight line in the longitudinal direction of the insert or alternatively wound in a meandering or spiral-like manner within a band-shaped region. This makes it possible to expand the action of the wires over the width of the respective region. Such arrangements are moreover flexible and insensitive with respect to mechanical effects. It is optionally possible to embed wire arrangements in a plastic matrix. This holds the arrangement of the wires in the predefined position and protects it against mechanical effects.

As an alternative, in a similar way to a flexible circuit board, the insert may comprise one or more thin foils, with respectively one or more conductor tracks being arranged on one side or on either side of at least one of these foils. Such foils that are usable as substrate for conductor tracks may be manufactured e.g. from polyimide (PI) or a polyester such as e.g. polyethylene terephthalate (PET), in particular from a biaxially oriented polyester film (BO-PET) having a high tensile strength.

Two or more electrically conductive tracks running in the longitudinal direction of the insert are preferably arranged in such foils, for example tracks made of rolled or electrolytically deposited copper.

Inserts with electrically conductive elements may be used e.g. for the passage of electrical current and/or electrical control signals. Branch lines to the conductors of the insert can be connected at any desired points along the edge member. Such branch lines may be e.g. conductor tracks arranged on the secondary sheet material transversely with respect to the longitudinal direction of the insert and electrically conductively connected to the respective conductor tracks of the insert via contacts. In particular in a similar way to a flexible circuit board, the secondary sheet material may comprise one or more thin foils with respectively one or more conductor tracks arranged on one side or on either side thereof.

In further alternative embodiments, the secondary sheet material may comprise one or more conductor tracks, preferably continuous in the longitudinal direction, and electrical conductor tracks that are connected thereto, are arranged in the transverse direction, and are in the form of branch lines. This has the advantage that the branch lines are always reliably connected to the respective longitudinal lines. Edge members in which electrical connection lines are arranged without interruption only on the secondary sheet material can be produced easily and cost-effectively and provide secure and reliable electrical connection lines.

Functions of the insert, such as e.g. providing a thin, flexurally rigid portion of the edge member that is able to bear tensile loads and can be guided in a guide rail, can be optimized independently of optionally required electrical connection lines.

In the case of awnings having such edge members, e.g. sensors and/or actuators or drives of a control system may be arranged at virtually any desired points and connected to one another via the electrical connection lines of the edge members. Via such connection lines, it is possible to easily supply energy to parts of control systems that are stationary and/or movable relative to one another, and/or have these parts communicate with one another. In particular, energy can be easily supplied to elements in the deployment profile of an awning.

Connection lines in edge members may also be used to conduct electrical energy photovoltaically generated in the region of the sheet material to a storage device and/or to an electrical consumer.

In the region of at least one of the two ends, an edge member may comprise e.g. a plug-in connector for connecting electrical conductors of the edge member to continuing electrical conductors.

In the case of awnings with rectangular awning cloths, it is possible, e.g. along the two lateral edges, to fasten edge members that are longer than the lateral edges of the awning cloth and protrude beyond the front and/or the rear edge of the awning cloth. Via plug-in connectors, the electric lines of the edge member can be easily connected to corresponding plug-in connectors on a winding shaft or on a deployment profile of the awning.

BRIEF DESCRIPTION OF THE DRAWINGS

The invention (one or more exemplary embodiments of the invention) will be described in more detail below with reference to some figures, in which.

DETAILED DESCRIPTION

Figure 1:
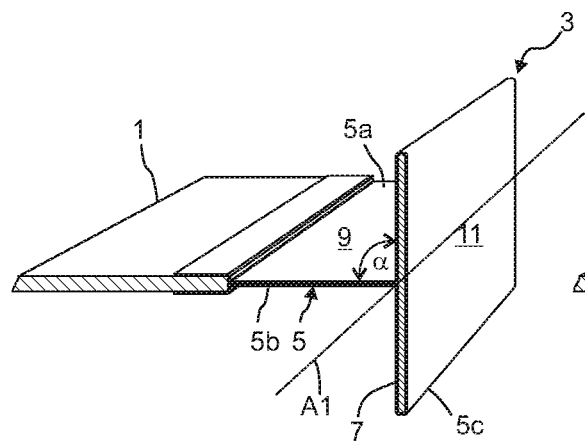
FIG. 1 shows a portion of an arrangement with an edge member fastened to the edge of an awning cloth in a first configuration with two orthogonally aligned legs.
Figure 2:
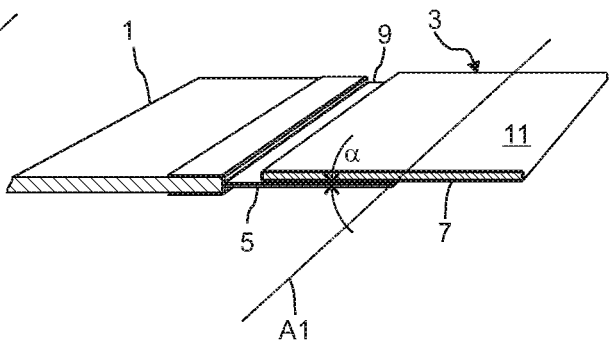
FIG. 2 shows the portion of the arrangement from FIG. 1 in a second configuration with parallel-aligned legs.

FIGS. 1 and 2 show perspective illustrations of an edge portion of an awning cloth, or in general a primary sheet material 1 and an edge member 3 arranged along this edge portion and connected to the primary sheet material 1. The edge member 3 comprises a band-like, very thin secondary sheet material 5, for example a woven fabric, a foil or a laminate with high tensile strength, and an elongate insert 7, for example a thin band element made of a plastic with higher flexural rigidity than the secondary sheet material 5. A central portion 5c of the secondary sheet material 5 is looped around the insert 7 transversely with respect to the longitudinal direction of said secondary sheet material, with the result that it sheaths or encapsulates said insert and defines a second leg 11 of the edge member 3. Two outer portions 5a, 5b of the secondary sheet material 5 that are connected to one another define the first leg 9 of the edge member 3. The second leg 11 is connected to the first leg 9 in a manner adjoining the first leg 9 and so as to be able to pivot about a pivot axis A1 running in the longitudinal direction of the two legs 9, 11. The thin secondary sheet material 5 acts as a film hinge in the region of the pivot axis A1. The precise position of the pivot axis A1 may vary slightly on account of properties of the secondary sheet material 5, such as e.g. its thickness D2 and elasticity depending on the angle of inclination α of the second leg 11 relative to the first leg 9. FIGS. 1 to 4 respectively symbolically illustrate the pivot axis A1 in a representative position. The end regions of the two outer portions 5a, 5b of the secondary sheet material 5 are connected in an overlapping manner to opposite surfaces in the edge region of the primary sheet material 1 e.g. by means of a hotmelt adhesive.

Figure 9:
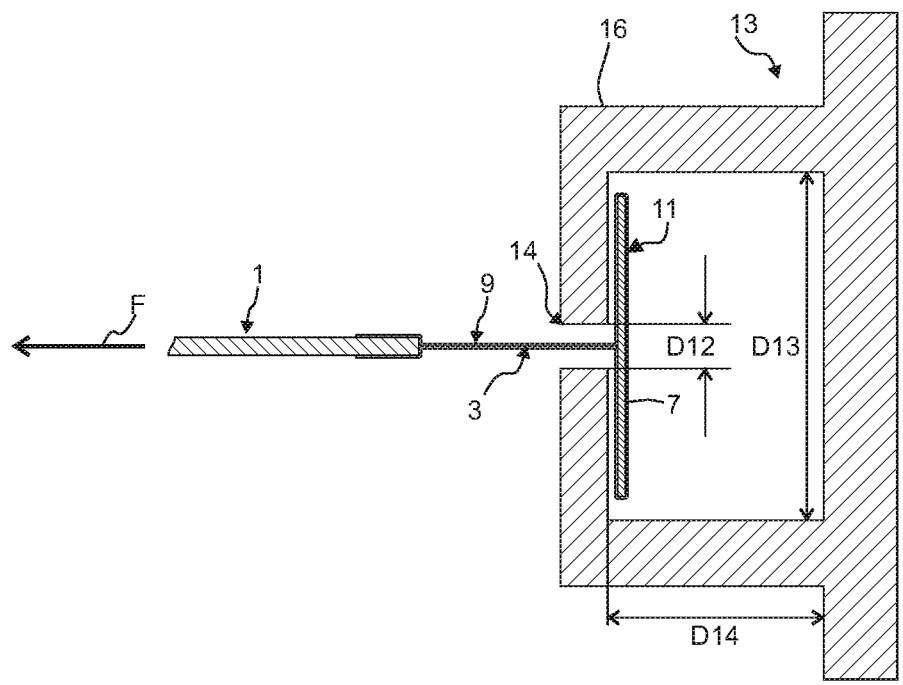
FIG. 9 shows a cross section through a detail of an arrangement of an awning cloth guided in a guide rail by means of an edge member.

FIG. 1 shows a first configuration of the arrangement, with the second leg 11 being aligned relative to the first leg 9 by an angle of inclination α of approximately 90°. In this first configuration, the edge member 3 may be used as means for holding and guiding the primary sheet material 1 in a lateral guide rail 13 with a C-shaped cross section (FIG. 9).

Figure 3:
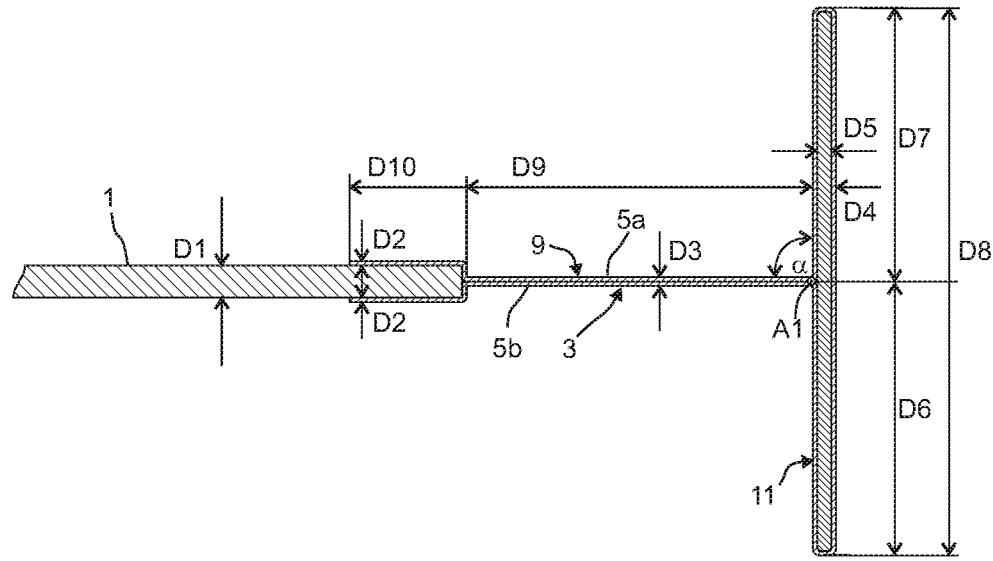
FIG. 3 shows an enlarged cross section through the arrangement in the configuration according to FIG. 1.
Figure 4:
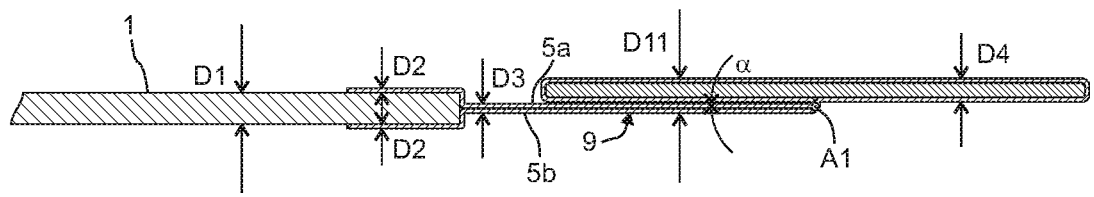
FIG. 4 shows an enlarged cross section through the arrangement in the configuration according to FIG. 2.

FIG. 2 shows the arrangement in a second configuration, with the second leg 11 being folded over clockwise by 90° with respect to the configuration in FIG. 1 and being aligned parallel to the first leg 9. The angle of inclination α is approximately 0°. In this configuration, the arrangement of the primary sheet material 1 with the edge member 3 fastened thereto can be rolled up onto a winding shaft arranged transversely with respect to the longitudinal direction of the edge member 3 easily and without the formation of waves. FIGS. 3 and 4 show enlarged cross sections through the arrangements in FIGS. 1 and 2.

The thickness D1 of the primary sheet material 1 is generally less than 1 mm in the case of an awning cloth. It may be in the range of approximately 0.4 mm to approximately 0.6 mm. Disregarding adhesive layers, the thickness of which may be of the order of magnitude of 0.05 mm or less, the thickness D4 of the second leg 11 of the edge member 3 substantially corresponds to the thickness D5 of the insert 7 plus two times the thickness D2 of the secondary sheet material 5. The thickness D4 of the second leg 11 may be of the order of magnitude of the thickness D1 of the primary sheet material 1 and is preferably smaller than or the same as D 1. The maximum thickness D11 of the edge member 3 in the configuration according to FIG. 4 with parallel-aligned legs 9, 11, in the case of such arrangements, is preferably smaller than or the same as the thickness D1 of the primary sheet material 1 plus two times the thickness D2 of the secondary sheet material 5. For application in the case of an awning cloth, the thickness D2 of the secondary sheet material 5 is of the order of magnitude of 0.1 mm or less at least in the region of overlap with the awning cloth. Since for such embodiments two respective layers of the secondary sheet material 5 are connected to the edge portion of the primary sheet material 1 in an overlapping manner, the maximum thickness D11 of the edge member 3 in the configuration according to FIG. 4, in addition to the overlapping portion, is at most the same as the thickness of the sheet material arrangement in the overlapping portion.

The second leg 11 has a width D8 which, in the case of an awning cloth, is preferably of the order of magnitude of approximately 4 mm to approximately 12 mm, in particular in the range of approximately 4 mm to approximately 8 mm. The pivot axis A1, or the film hinge, may be arranged approximately in the middle between the two longitudinal edges of the second leg 11, as illustrated in FIGS. 1 to 4. The widths D6 and D7 of the two portions, starting from the pivot axis A1 or the film hinge, of the second leg 11 are approximately the same, specifically D8/2, in the case of such edge members 3. As an alternative, the second leg 11 may also be articulated asymmetrically on the first leg 9. The film hinge, or the pivot axis A1, may be arranged at any desired point between the two longitudinal edges of the second leg 11. The edge member 3 may thus be designed to correspond to the conditions of different applications. Thus, e.g. an asymmetrical edge member 3 with different portion widths D6 and D7 of the second leg 11 is suitable for guidance in a guide rail 13, with an asymmetrically arranged guide gap 14.

The width D10 of the first leg 9 is preferably dimensioned such that a portion, adjoining the second leg 11, of this first leg 9 has a width D9 which is at least the same as the width D6 or the width D7 of the respective portion of the second leg 11, which lies against the first leg 9 in the folded-over configuration, and such that a sufficiently wide end portion of the first leg 9 is available for connection to the primary sheet material 1.

In the case of an edge member 3 with a second leg 11 comprising a width D8 of 4 mm with two portions of widths D6=D7=2 mm, the width D9 may be e.g. approximately 2.5 mm and the overall width D10 of the first leg 9 may be of the order of magnitude of approximately 8 mm to approximately 12 mm, for example. Such edge members 3 are very narrow and barely visible compared with the width of cloth webs of an awning. The secondary sheet material 5 may be designed as virtually transparent for visible light at least in the region of the first leg 9. In the case of blackout systems, it is therefore also possible for no light to shine through in the edge region between the primary sheet material 1 and adjacent guide rails 13.

In the case of arrangements according to FIGS. 1 to 4, the level of the first leg 9 corresponds approximately to a central level between the two surfaces of the primary sheet material 1. The edge region of the top portion 5a of the secondary sheet material 5 overlaps the top surface of the primary sheet material 1, and the edge region of the bottom portion 5b overlaps the bottom surface.

Figure 5:
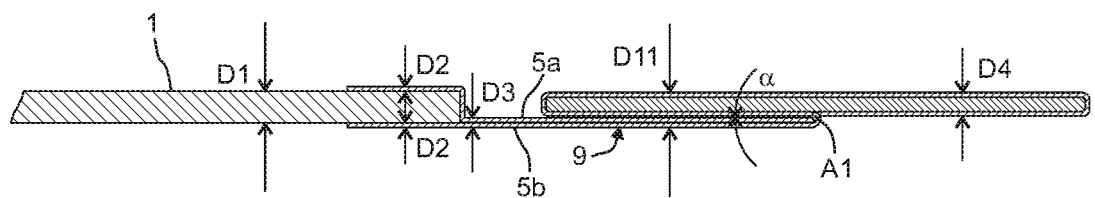
FIG. 5 shows an alternative arrangement with an edge member fastened to the awning cloth on both sides.

The arrangement according to FIG. 5 differs from that in FIG. 4 in that the central level of the first leg 9 corresponds approximately to that of the bottom surface of the primary sheet material 1.

Figure 6:
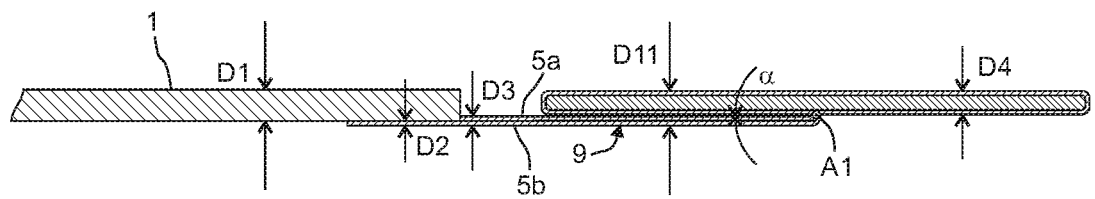
FIG. 6 shows an alternative arrangement with an edge member fastened to the awning cloth on one side.

The arrangement according to FIG. 6 differs from that in FIG. 5 in that the top portion 5a of the secondary sheet material 5 is shorter than the bottom portion 5b, with the result that it does not overlap the primary sheet material 1. Only the bottom portion 5b overlaps the bottom surface of the primary sheet material 1 and is connected thereto. As an alternative, it would also be possible for both portions 5a, 5b to have the same width and be jointly connected to the primary sheet material 1 only on one of the surfaces (this is not illustrated). In the production of such sheet material arrangements, the secondary sheet material 5 can be connected to the primary sheet material 1 comparatively easily.

Figure 7:
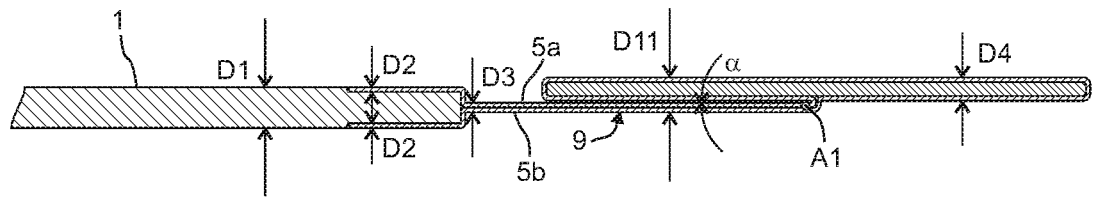
FIG. 7 shows an arrangement similar to that in FIG. 4, but with an edge member fastened to the awning cloth flush on both sides.

The arrangement in FIG. 7 differs from that in FIG. 4 in that the edge regions of the secondary sheet material 5 that overlap the respective surfaces of the primary sheet material 1 are arranged at least approximately flush with the respectively adjacent surface portion of the primary sheet material 1. This can be achieved e.g. in that the primary sheet material 1 and the secondary sheet material 5 are welded to one another by means of ultrasonic energy in the common region of overlap. In alternative embodiments, it would be possible for the primary sheet material 1 to have a reduced thickness compared with the thickness D1 in the region of overlap.

Figure 8:
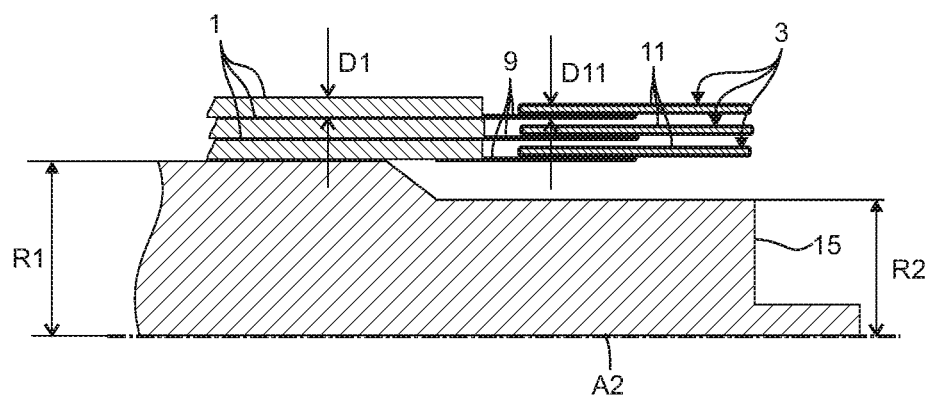
FIG. 8 shows a cross section through a detail of an arrangement having three plies of an awning cloth, rolled up on a winding shaft, in the region of the edge member.

FIG. 8 shows a sectional image of a detail of an arrangement of three plies of a primary sheet material 1 and of an edge member 3 connected to this primary sheet material 1 in the edge region that are rolled up on a winding shaft 15. The winding shaft 15 defines a winding axis A2 and is mounted rotatably about this winding axis A2. In one configuration, the edge member 3 is rolled up on the winding shaft 15, together with the primary sheet material 1, transversely in relation to the winding axis A2 with the second leg 11 aligned parallel to the primary sheet material 1 and to the first leg 9. The rolled-up plies of the primary sheet material 1 lie against one another. Since, in this configuration, the maximum thickness D11 of the edge member 3 is smaller than the thickness D1 of the primary sheet material 1, adjacent loops or plies of the edge member 3 have a little leeway. The winding shaft 15 may have a uniform winding-shaft radius R1 in the region of the sheet material arrangement to be rolled up. As an alternative, the winding shaft 15 as illustrated in FIG. 8 may, in the end regions or in the edge regions of the sheet material arrangement to be rolled up, have a radius R2 that is smaller than the winding-shaft radius R1 in the central region. Such winding shafts 15 are usually used to roll up conventional awning cloths with thicker edges.

FIG. 9 shows a cross section through a detail of a sheet material 1 which is held so as to be able to be guided in a guide rail 13 by means of an edge member 3. The guide rail 13 comprises a cross-sectionally C-shaped guide profile 16, which delimits a guide space and has a guide gap 14, through which the first leg 9 of the edge member 3 is guided. The second leg 11 of the edge member 3 is aligned transversely with respect to the first leg 9 within the guide space. When a tensile force is exerted on the first leg 9 in the direction of the arrow F, the second leg 11 lies against the guide profile 16 on the inside on either side of the guide gap 14. The edge member 3 holds the sheet material 1 on the guide rail 13 in a form-fitting manner and so as to be displaceable in the longitudinal direction of the guide profile 16. The insert 7 confers increased flexural rigidity on the second leg 11 and promotes these effects. Even in the case of edge members 3 with narrow second legs 11 of the order of magnitude of a few millimeters, e.g. in the case of awnings, portions of the edge member 3 with a length of 5 cm can be subjected to loading with tensile forces that act in the direction of the arrow F and are of the order of magnitude of 300 N without problems. The width D12 of the guide gap 14 may be comparatively narrow. It is preferably of the order of magnitude of the maximum thickness or two times the maximum thickness D11 of the edge member 3 in the configuration with parallel-arranged legs 9, 11. The width D13 and depth D14 of the guide space may be comparatively small, corresponding to the dimensions of the second leg 11 of the edge member 3. In particular, the dimensions of the edge member 3 and of the guide space are matched to one another such that, in the configuration with parallel-arranged legs 9, 11, the second leg 11 of the edge member 3 can be inserted completely into the guide space through the guide gap 14 in the region of the guide rail 13. After that, the second leg 11 is pivoted onto the edge member 3, e.g. by elastic return forces of the edge member 3 and/or by forces acting externally on the edge member 3. After only a slight change in the angle of inclination α formed by the legs 9, 11, this second leg 11 is pivoted completely into the holding position illustrated in FIG. 9, by bearing against the inside of the guide profile 16, with the exertion of a tensile force on the first leg 9 in the direction of the arrow F.

In the case of an edge member 3 in which a longitudinal edge of the second leg 11 is articulated on a longitudinal edge of the first leg 9 (L-shaped design), the region with this second leg 11 can be introduced analogously into the guide space of a guide rail 13 through the guide gap 14. To hold and guide such an edge member 3 in the guide rail 13, already a comparatively smaller angle of inclination α of approximately 5° to approximately 45°, for example, is generally sufficient. In such arrangements, guide rails 13 preferably comprise a profile with an optimized cross section, which securely retains the second leg 11 in the guide space when a tensile force is exerted on the first leg 9 in the direction of the arrow F. This can be achieved, for example, in that the end portions of the guide profile 16 that adjoin the guide gap 14 are arranged inclined toward the guide space (this scenario not being illustrated).

The guide profile has an open end adjacent to a winding shaft 15. When the sheet material arrangement is being rolled up or unrolled, the edge member 3 changes configuration in a transition region between the guide profile 16 and the winding shaft 15 owing to the acting torsional forces. When the portion of the edge member 3 is rolled up on the winding shaft 15, the legs 9, 11 of said edge member have a parallel alignment.

The sheet material arrangements may also be rolled up onto winding shafts 15 with comparatively small diameters. Guide rails 13 for holding and guiding such sheet material arrangements may be formed easily and with comparatively small dimensions. The planning leeway for installations with such sheet material arrangements is comparatively great.

Figure 10:
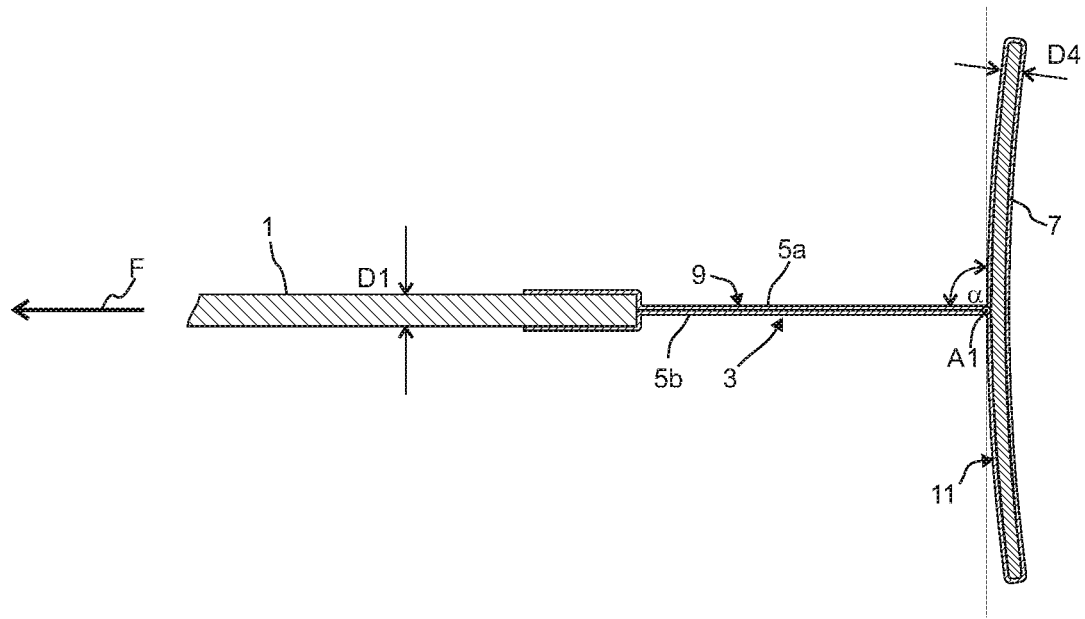
FIG. 10 shows a cross section through a detail in the edge region of an awning cloth with an alternative edge member.
Figure 11:
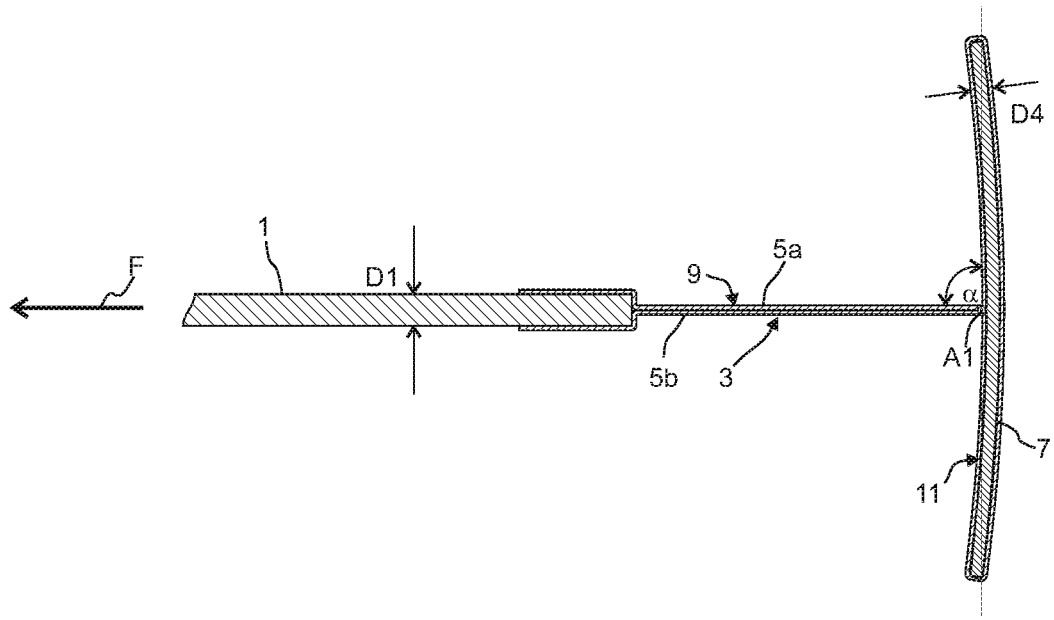
FIG. 11 shows a cross section through a detail in the edge region of an awning cloth with a further alternative edge member.

FIGS. 10 and 11 show cross sections through alternative embodiments of the edge member 3, with the second leg 11 being slightly convexly or concavely curved, respectively, in a rest position without the action of external forces. This may be brought about e.g. by a correspondingly curved insert 7 with sufficient flexural rigidity.

In particular in the case of embodiments with a concavely curved second leg 11 according to FIG. 11, the insert 7 has a spring action, which enables small movements of the sheet material 1 counter to the acting spring force when tensile forces are exerted in the direction F of the first leg 9. This facilitates e.g. the fastening of an awning cloth to two opposite guide rails 13. In addition, edge members 3 with such resiliently elastically deformable second legs 11 can compensate structural tolerances in width between two opposite guide rails 13. As an alternative or in addition, it would also be possible for the first leg 9 of the edge member 3 or a portion of this first leg 9 in the case of at least one of the edge members 3 of a sheet material arrangement to have an elastically extensible form with regard to tensile loading in the direction of the arrow F.

Figure 12:
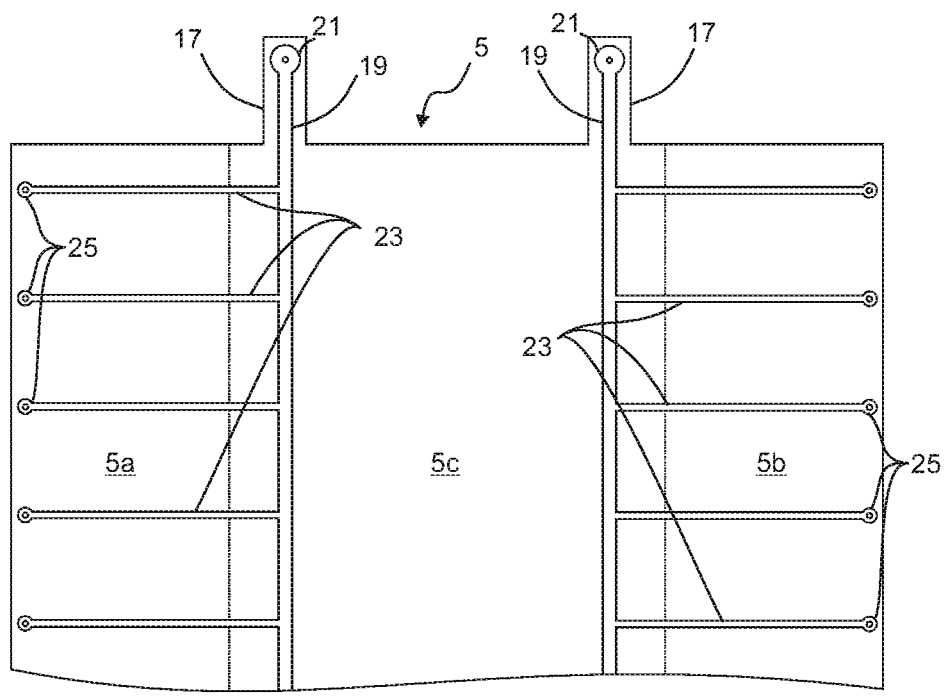
FIG. 12 shows a secondary sheet material with conductor tracks.

FIG. 12 shows a detail of the end region of a secondary sheet material 5 before it is worked by looping it around and adhesively bonding it to an insert 7 to form an edge member 3. The three portions 5a, 5b and 5c are illustrated in a manner separated by broken lines. When the edge member 3 is finished, the portions 5a and 5c are connected to one another in a portion adjoining the portion 5c, with the film hinge being formed at the broken lines. The secondary sheet material 5, in the end region, comprises two protruding tabs 17 and longitudinally continuous main electrical conductor tracks 19, which at each tab 17 are connected to a contact 21 for hooking up a plug element for a continuing electrical conductor. The secondary sheet material 5 comprises one or more branching conductor tracks 23 which are preferably arranged uniformly spaced apart transversely with respect to the main conductor tracks 19 and connected thereto. In the end regions of the lateral portions 5a and 5b of the secondary sheet material 5, these branching conductor tracks are connected to contacts 25 for establishing electrical connections in the region of the primary sheet material 1. In alternative embodiments, the secondary sheet material 5 may comprise respectively only one or multiple tabs 17 at one or the two end regions. For each tab 17, one or more conductor tracks 19 with corresponding contacts 21 may be provided, which can be connected e.g. directly to clamping contacts, in a similar way to contacts of a flexible printed circuit.

The invention claimed is:

1. A sheet material arrangement, comprising:
a flexible primary sheet material;
at least one edge member connected to the primary sheet material along an edge portion of the primary sheet material
the edge member comprises a band-shaped secondary sheet material and an insert;
the secondary sheet material, together with the insert, defines a structure with first and second legs, with the second leg comprising a portion of the secondary sheet material that is looped around the insert transversely to a longitudinal direction of the secondary sheet material, and the first leg comprising adjacent portions of the secondary sheet material, with the second leg being connected to the first leg so as to be pivotable about a common pivot axis extending in the longitudinal direction of the two legs;
the pivot axis is arranged at one of the longitudinal edges of the first leg and between the longitudinal edges of the second leg; and
the second leg being pivotable into a position in which rolling up can take place and in which the second leg is aligned substantially parallel to the first leg.

2. The sheet material arrangement as claimed in claim 1, wherein the secondary sheet material comprises at least one of a woven fabric, a foil, or a laminate.

3. The sheet material arrangement as claimed in claim 1, wherein a thickness of the second leg of the secondary sheet material is smaller than or equal to a thickness of the primary sheet material.

4. The sheet material arrangement as claimed in claim 1, wherein a thickness of the secondary sheet material is smaller than or equal to one quarter of a thickness of the primary sheet material.

5. The sheet material arrangement as claimed in claim 1, wherein the primary sheet material is an awning cloth, and a respective one of the edge members is fastened at two opposite edge portions of the awning cloth.

6. The sheet material arrangement as claimed in claim 1 wherein each said edge member is connected to the primary sheet material in that at least one of end portions of said secondary sheet material are arranged so as to overlap a respective surface of the primary sheet material and is at least one of adhesively bonded or welded thereto.

7. The sheet material arrangement as claimed in claim 1, wherein the insert comprises a flat or curved band element of metal or plastic, a flexural rigidity of which is greater than that of the secondary sheet material.

8. The sheet material arrangement as claimed in claim 1, wherein the insert comprises an electrically conductive wire.

9. The sheet material arrangement as claimed in claim 1, wherein the secondary sheet material comprises electrical conductor tracks connected to electrical contacts.

10. The sheet material arrangement as claimed in claim 9, wherein one or two end regions of the secondary sheet material comprises respectively one or more protruding tabs, and at least one said electrical contact and one said conductor track connected thereto are arranged on at least one of the tabs.

* * * * *